United States Patent
Brainos et al.

(10) Patent No.: US 7,885,342 B2
(45) Date of Patent: Feb. 8, 2011

(54) MANAGING BIT ERROR RATES ON POINT-TO-POINT WIRELESS LINKS IN A NETWORK

(75) Inventors: Alain Brainos, Ashburn, VA (US); David Buster, Raleigh, NC (US); Christopher James Lefelhocz, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1007 days.

(21) Appl. No.: 11/682,229

(22) Filed: Mar. 5, 2007

(65) Prior Publication Data

US 2008/0219334 A1 Sep. 11, 2008

(51) Int. Cl.
*H04L 27/00* (2006.01)
*H03K 5/00* (2006.01)
*H03K 9/00* (2006.01)

(52) U.S. Cl. .............................. 375/259; 327/1; 327/100
(58) Field of Classification Search .................. 375/259
See application file for complete search history.

(56) References Cited

U.S. PATENT DOCUMENTS

| | | | |
|---|---|---|---|
| 4,528,551 A * | 7/1985 | Agrawal et al. | 341/143 |
| 6,490,460 B1 | 12/2002 | Soliman | |
| 6,748,233 B1 | 6/2004 | Arnold et al. | |
| 7,107,498 B1 | 9/2006 | Schmidt et al. | |
| 7,151,894 B2 | 12/2006 | Fan et al. | |
| 2005/0210356 A1* | 9/2005 | Chou et al. | 714/752 |
| 2005/0283715 A1* | 12/2005 | Sutivong et al. | 714/790 |
| 2007/0116051 A1* | 5/2007 | Chen | 370/469 |

* cited by examiner

*Primary Examiner*—David C Payne
*Assistant Examiner*—Erin M File
(74) *Attorney, Agent, or Firm*—Brinks Hofer Gilson & Lione

(57) ABSTRACT

In one embodiment, a method includes receiving, from a decoder connected to a wireless receiver for communication with a remote apparatus, first error data that indicates a current error rate that corresponds to a first inbound data packet received from the remote apparatus. Based in part on the first error data, it is determined whether the remote apparatus should increase a current signal to noise ratio. If so, then a first outbound data packet is sent to an encoder connected to a wireless transmitter. The first outbound data packet includes first link conditioning request data that indicates a current signal to noise ratio for one or more data packets received from the remote apparatus based at least in part on the first error data. The remote apparatus increases signal to noise ratio of transmissions in response to receiving the outbound data packet.

31 Claims, 9 Drawing Sheets

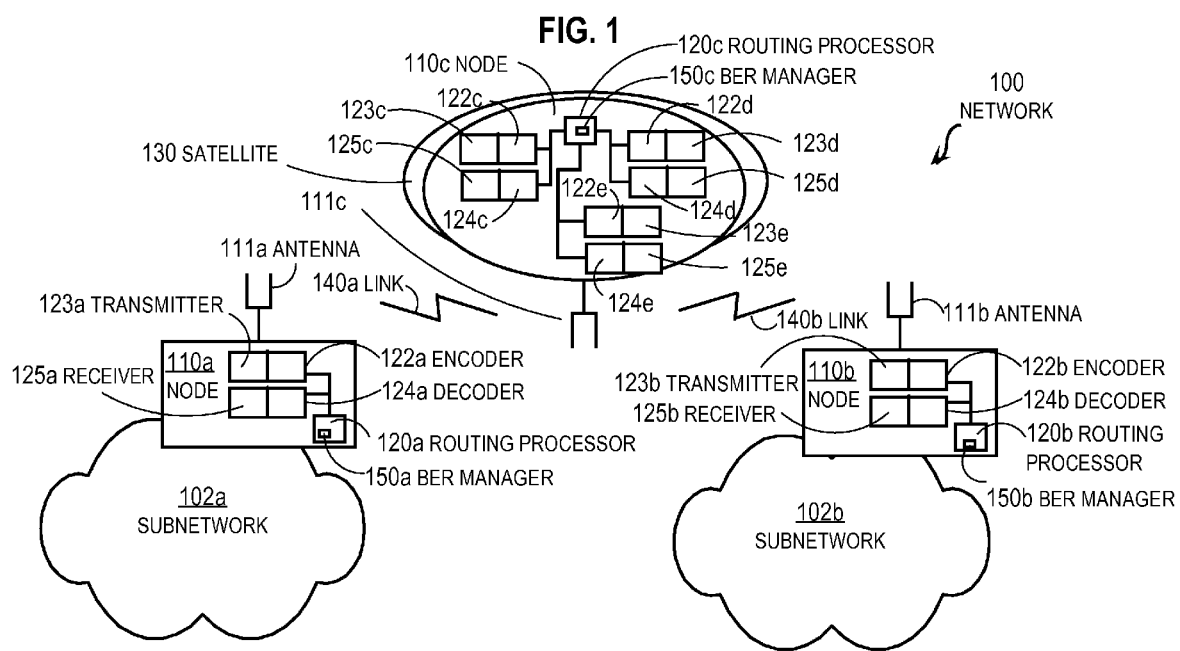

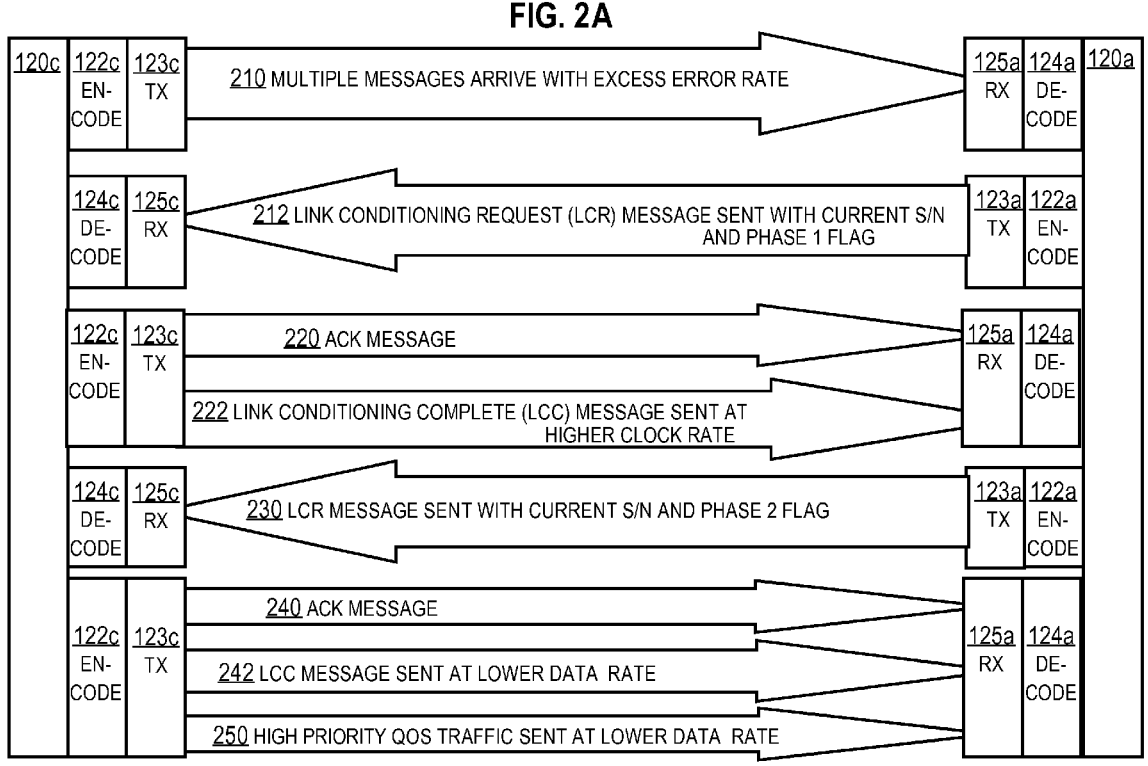

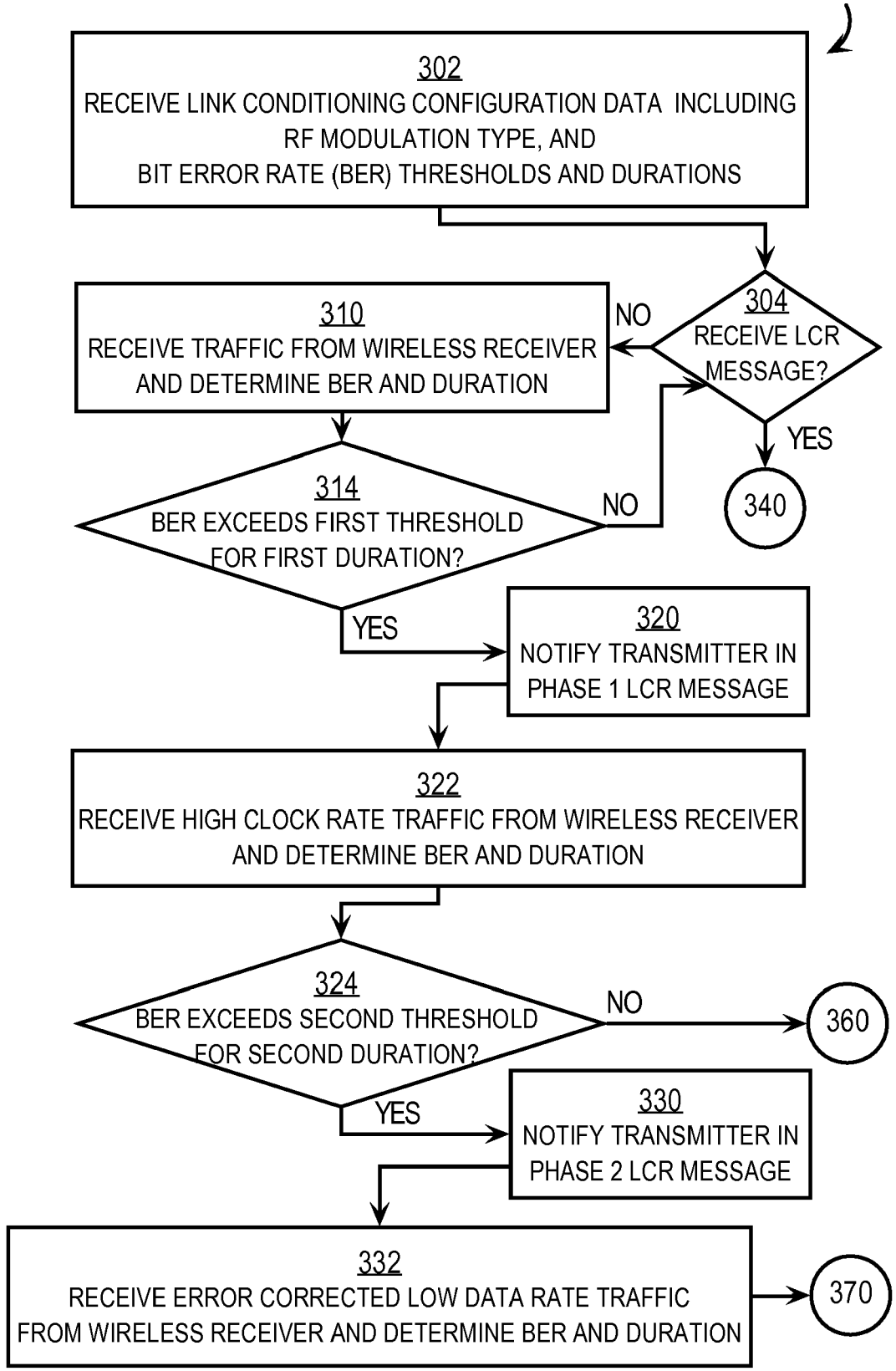

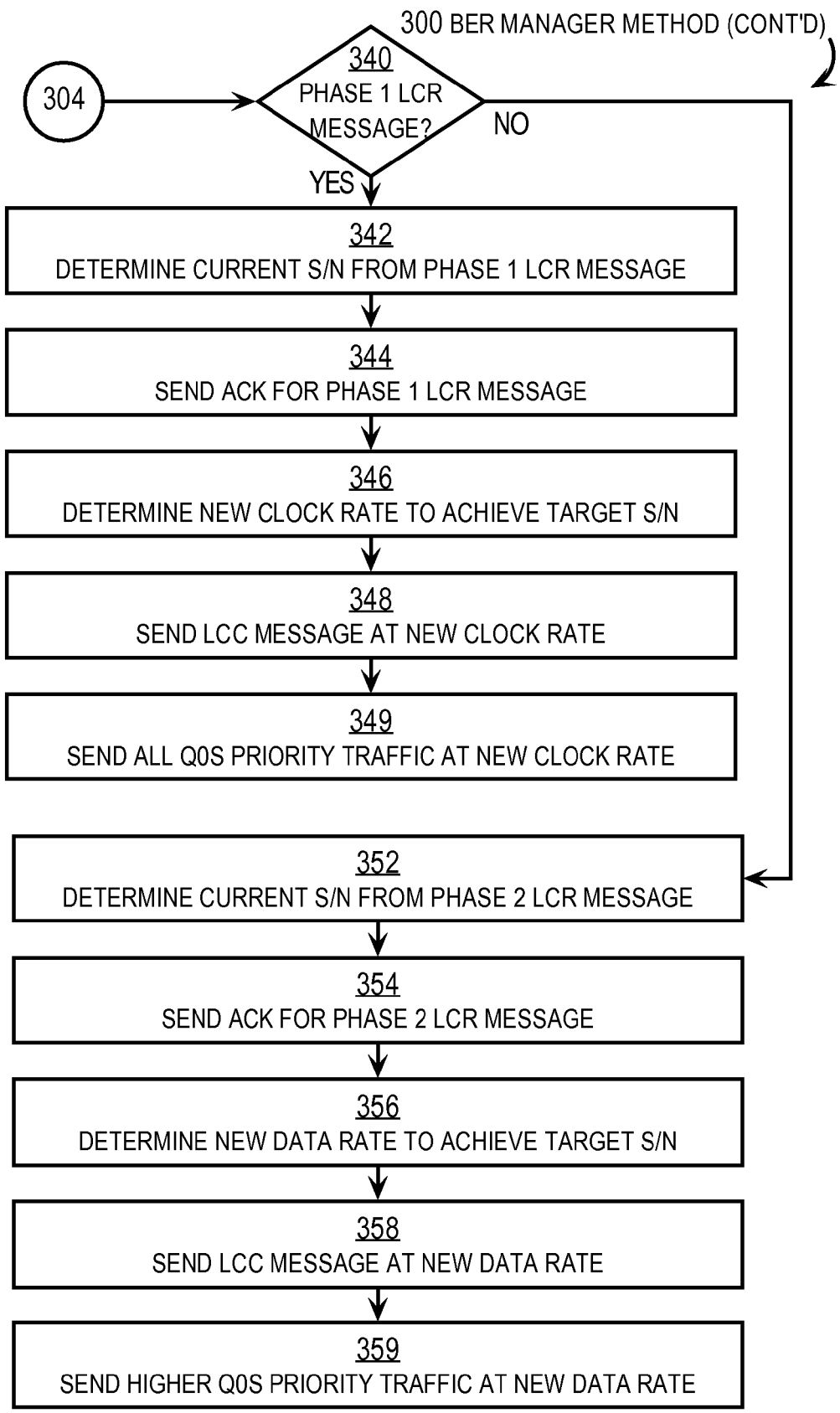

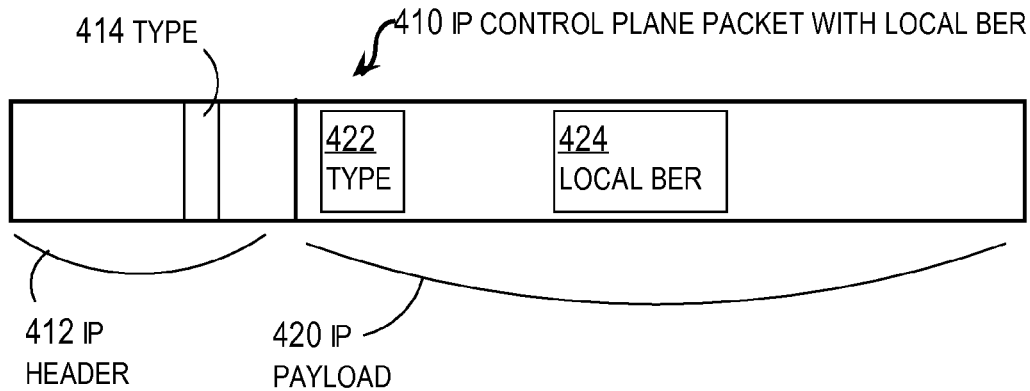
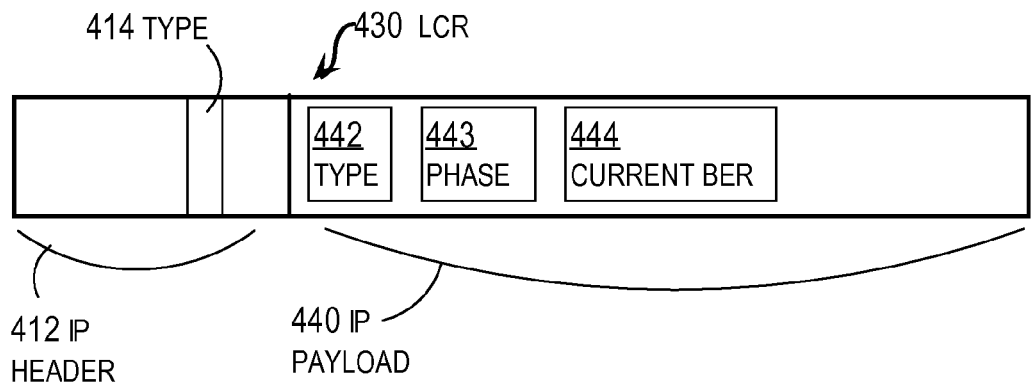
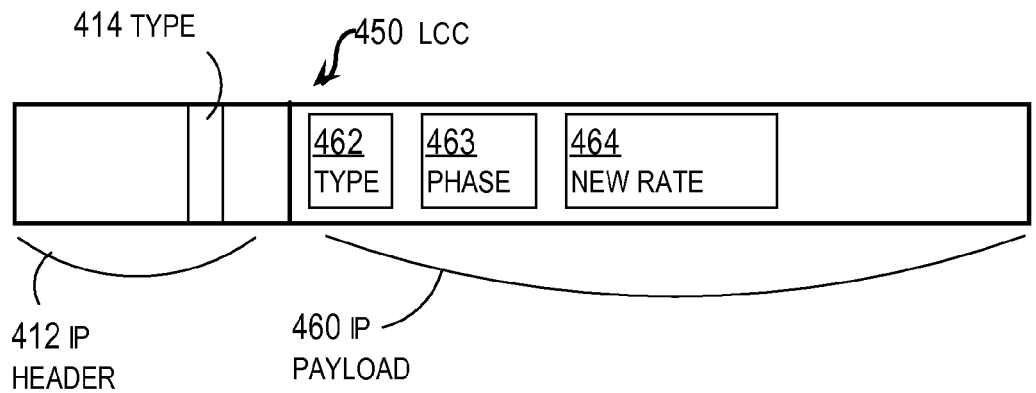

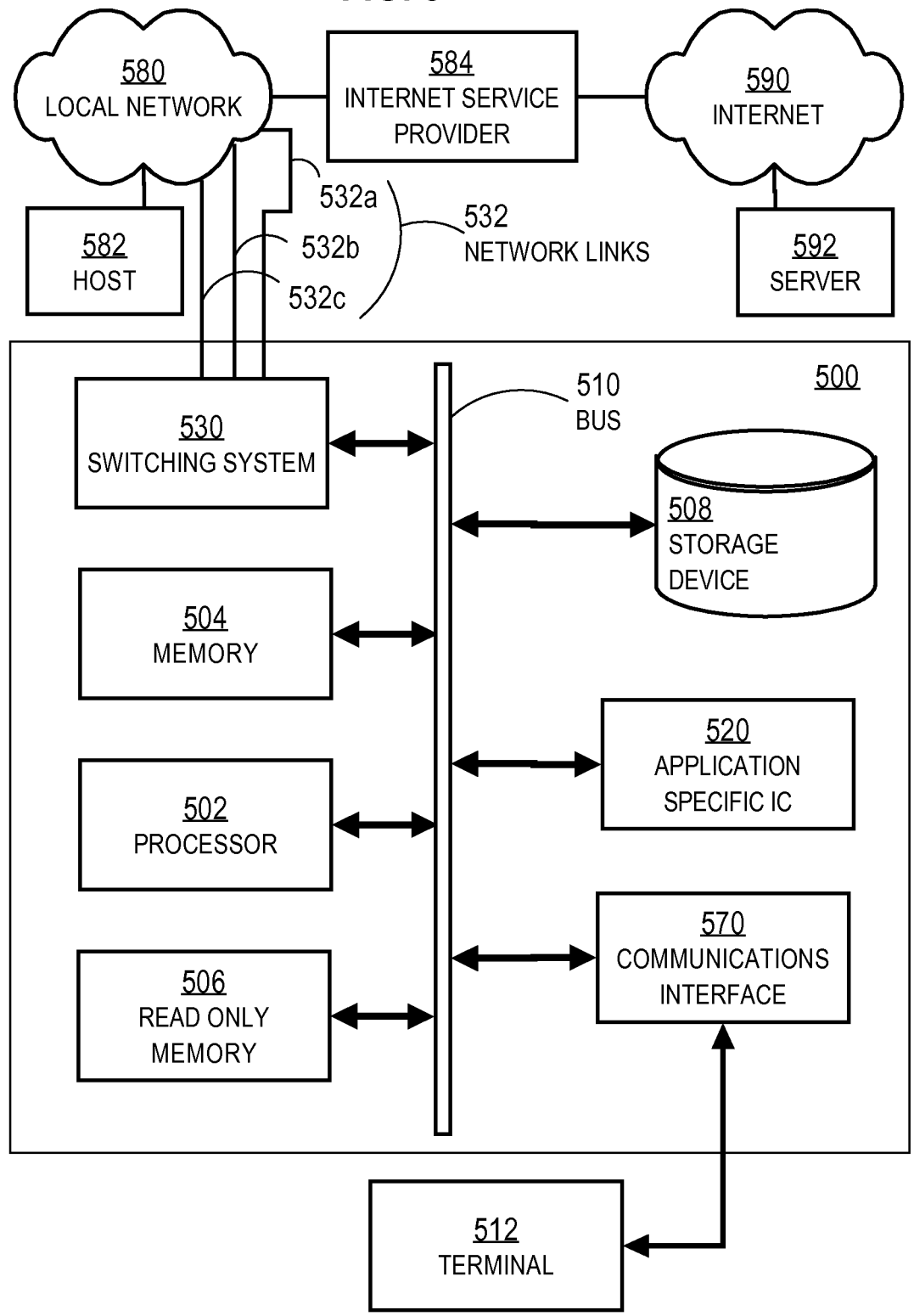

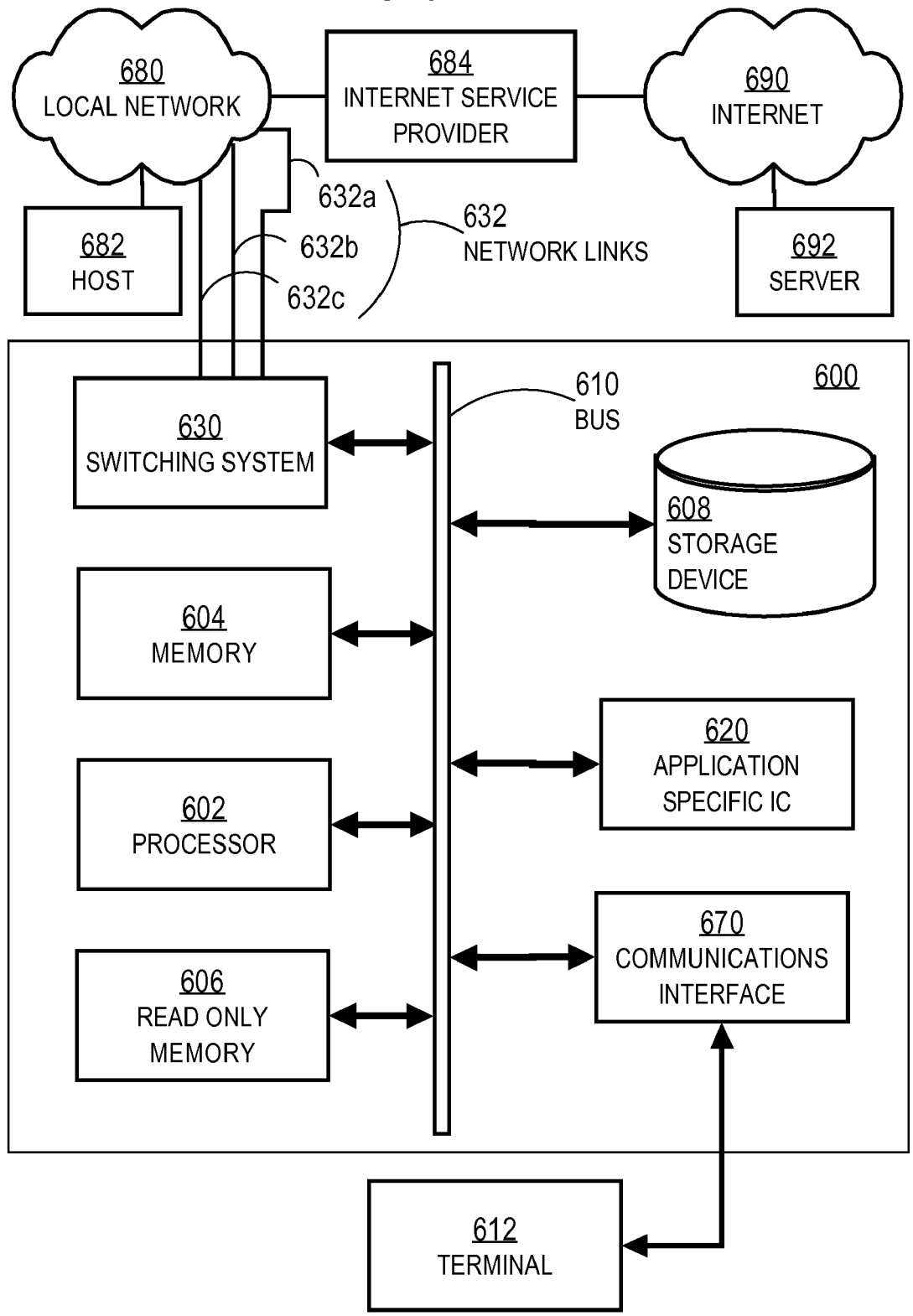

MANAGING BIT ERROR RATES ON POINT-TO-POINT WIRELESS LINKS IN A NETWORK

BACKGROUND OF THE INVENTION

1. Field of the Invention

The present invention relates to wireless links in a network, such as wireless links to an intermediate network node orbiting the earth on a satellite.

2. Description of the Related Art

Networks of general-purpose computer systems and other devices connected by external communication links are well known and widely used in commerce. The networks often include one or more network devices that facilitate the passage of information between the computer systems and devices. A network node is a network device or computer system connected by the communication links. As used herein, an end node is a network node that is configured to originate or terminate communications over the network. In contrast, an intermediate network node facilitates the passage of data between end nodes.

Some networks include two or more intermediate network nodes that communicate with each other over one or more wireless links. Some wireless links called point-to-point wireless links are dedicated to communications between two particular intermediate nodes, such as by dedicating a particular electromagnetic frequency to such communications. Changing environmental conditions can adversely impact propagation of electromagnetic carrier waves that provide that wireless link and can reduce a signal to noise (S/N) ratio of signals received over that wireless link, thus interfering with passage of data packet traffic over the wireless link.

Corrective action includes automatically detecting the reduction in S/N ratio and automatically increasing power of transmission (e.g., automatic gain control). However, there are practical limits to the power increases that can be applied. For example, some noise components, such as scattering, are proportional to power and thus rise with the increase in power. As a further example, one or more components of an intermediate network node are designed for a maximum operating power and will fail when power levels exceed that maximum. Furthermore, some intermediate nodes have access to limited sources of power. On earth orbiting satellites, especially, power supply is severely limited.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 illustrates an example network with a point-to-point wireless link;

FIG. 2A illustrates an example temporal sequence of messages to respond to reduced signal to noise on a wireless link, according to an embodiment;

FIG. 3A, FIG. 3B, FIG. 3C and FIG. 3D illustrate a method to respond to changes in signal to noise ratio on a wireless link, according to an embodiment;

FIG. 4A illustrates an example of an IP control packet sent from a decoder to routing processor, according to an embodiment;

FIG. 4B illustrates an example link conditioning request (LCR) message, according to an embodiment;

FIG. 4C illustrates an example link conditioning complete (LCC) message, according to an embodiment; and FIG. 5 illustrates a computer system upon which an embodiment of the invention may be implemented.

DESCRIPTION OF EXAMPLE EMBODIMENTS

Figure 2B:
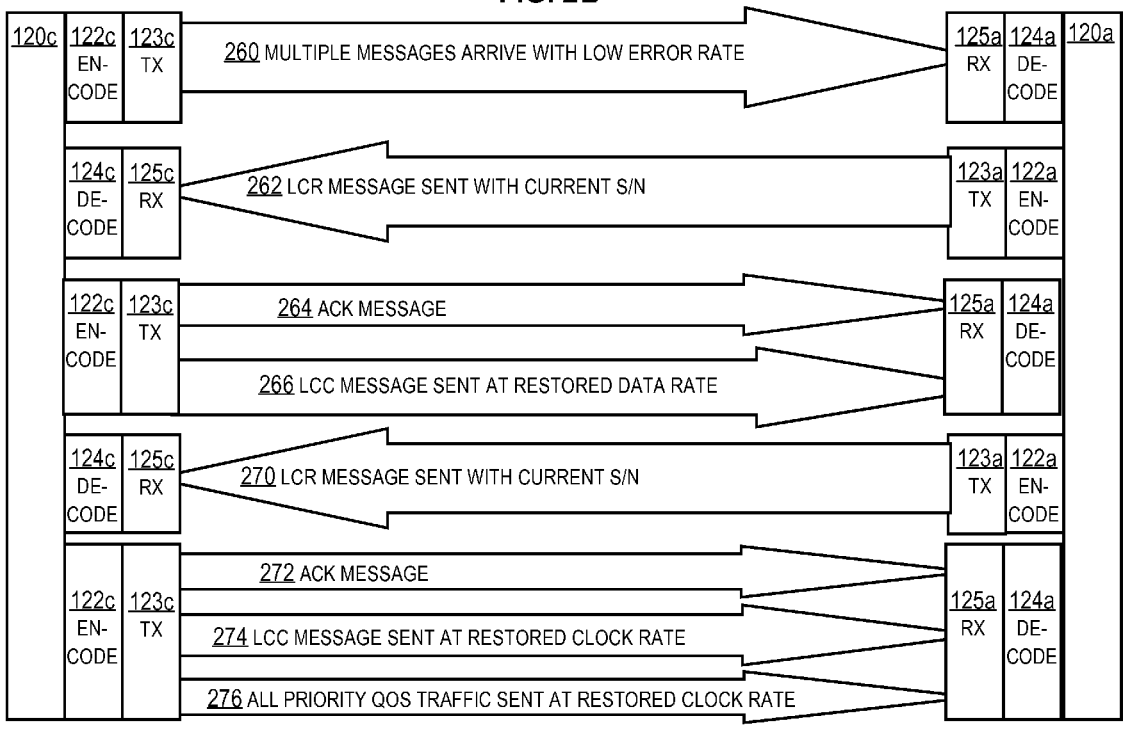
FIG. 2B illustrates an example temporal sequence of message to respond to restored signal to noise on a wireless link, according to an embodiment.

Techniques are described for responding to changes in signal to noise over a wireless link. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the invention are described herein in the context of a point-to-point wireless link with an intermediate network node on a low Earth orbit (LEO) satellite that is part of an Internet Protocol (IP) packet switched network. However, the invention is not limited to this context. In other embodiments, other wireless links with network nodes on other stationary or mobile platforms using other data multiplexing schemes and protocols are involved. For example, in some embodiments an asynchronous mode transfer (ATM) protocol or a Frame Relay (FR) protocol or both, well known in the networking arts, is used along with or instead of IP.

1.0 Overview

In a first set of embodiments, a method includes receiving, from a decoder connected to a wireless receiver for communication with a remote apparatus, first error data that indicates a current error rate that corresponds to a first inbound data packet received from the remote apparatus. Based in part on the first error data, it is determined whether the remote apparatus should increase a current signal to noise ratio. If so, then a first outbound data packet is sent to an encoder connected to a wireless transmitter. The first outbound data packet includes first link conditioning request data that indicates a current signal to noise ratio for one or more data packets received from the remote apparatus based at least in part on the first error data. The remote apparatus is configured for increasing signal to noise ratio of transmissions in response to receiving the outbound data packet.

In another set of embodiments, a method includes transmitting one or more data packets through an encoder connected to a wireless transmitter for wireless communication of a data packet with a remote apparatus. A first inbound data packet is received from a decoder connected to a wireless receiver in wireless communication with the remote apparatus. It is determined whether the first inbound data packet includes first link conditioning request data that indicates a current signal to noise ratio for the one or more data packets transmitted to the remote apparatus. If so, then data sent to the encoder is changed in order to effect an increase in the current signal to noise ratio to a target signal to noise ratio.

In other embodiments, an apparatus or system perform one or more steps of the above methods.

2.0 Network Overview

Information is exchanged between network nodes according to one or more of many well known, new or still developing protocols. In this context, a protocol consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

Communications between nodes on a packet-switched network are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, typically higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header, and some combination of a transport (layer 4) header, a session (layer 5) header, a presentation (layer 6) header and an application (layer 7) header as defined by the Open Systems Interconnection (OSI) Reference Model.

The popularity and good performance of packet switched networks has led to the expanded use of such networks for real time communications to support such applications as telephony, multimedia conferencing, gaming, and other real time shared data applications.

Advances in wireless communication link technology has led to increased use and popularity of wireless intermediate network nodes that serve as links or access points to a wired network for one or more wireless end nodes or intermediate network nodes.

FIG. 1 illustrates an example network 100 with a point-to-point wireless link, e.g, 140a. The network 100 includes a low earth orbit satellite 130 that links two subnetworks 102a, 102b, collectively referenced heron as subnetworks 102. Satellite 130 and subnetworks 102 each include one or more intermediate network nodes. Subnetwork 102 includes intermediate node 110a, subnetwork 102b includes intermediate node 110b, and satellite 130 includes intermediate network node 110c. Wireless link 140a is used for point-to-point communications between node 110a and satellite node 110c; and wireless link 140b is used for point-to-point communications between node 110b and satellite node 110c.

Node 110a includes a routing processor 120a connected to a wireless network interface. The wireless network interface includes a transmitter 123a (such as a radio frequency RF transmitter) connected to processor 120a through an encoder 122a and a receiver 125a connected to processor 120a through decoder 124a. Transmitter 123a and receiver 125a are connected to antenna 111a for transmitting and receiving wireless signals, such as RF signals (also called microwave signals). The node 110a also includes one or more other network interfaces (not shown) connected to one or more other nodes in subnetwork 102a. The collection of network interfaces on an intermediate network node and logic to control data passed through those interfaces constitute a switching system, such as switching system 530 depicted in FIG. 5 and described in more detail in a later section. Thus wired and wired network interfaces and all or part of a routing processor (e.g., routing processor 120a) are included in a switching system (e.g., switching system 530).

Similarly, node 110b includes a routing processor 120b connected to a wireless network interface with transmitter 123b connected to processor 120b through an encoder 122b and a receiver 125b connected to processor 120b through decoder 124b. Transmitter 123b and receiver 125b are connected to antenna 111b for transmitting and receiving wireless signals. The node 110b also includes one or more other network interfaces (not shown) connected to one or more other nodes in subnetwork 102b.

Satellite node 110c includes a routing processor 120c connected to multiple wireless network interfaces. In the illustrated embodiment, three wireless network interfaces include transmitters 123c, 123d, 123e, respectively, connected to processor 120c through encoders 122c, 122d, 122e, respectively. The wireless network interfaces also includes receivers 125c, 125d, 125e, respectively, connected to processor 120c through decoders 124c, 124d, 124e. Transmitters and receivers on satellite node 110c are connected to antenna 111c for transmitting and receiving wireless signals. The node 110c also includes one or more other network interfaces (not shown) connected to one or more other nodes on satellite 130.

The routing processors 120a, 120b, 120c (and other routing processors on other nodes, not shown, collectively termed routing processors 120, hereinafter) determine which wireless and wired network interfaces to employ to forward data packets received at other wired and wireless network interfaces. Components of routing processors are described in more detail below with reference to FIG. 5.

The encoders 122a, 122b, 122c, 122d, 122e (and other encoders on other wireless network interfaces, not shown, collectively termed encoders 122, hereinafter) convert digital data received in data packets from a routing processor (such as a series of binary voltage values representing the binary values 0 and 1) to signals that can be modulated onto electromagnetic carrier waves. Multiple common modulation types are well known in the art, such as minimum shift keying (MSK), phase shift keying (PSK), bi-phase shift keying (BPSK), differential BPSK (DBPSK), quadrature phase shift keying (QPSK), differential QPSK (DQPSK), offset keyed-quadrature phase shift keying (OK-QPSK), Coherent On-Off keying (OOK), Incoherent OOK; see Gerard Maral and Michel Bousquet, *Satellite Communications Systems*, Fourth Ed., 2003, John Wiley and Sons, Ltd., West Sussex, England, United Kingdom, the entire contents of which are hereby incorporated by reference as if fully set forth herein. The encoding process performed by the encoder often includes adding error correction bits so that a decoder attached to a remote receiver can detect and sometimes correct transmission errors.

The transmitters 123a, 123b, 123c, 123d, 123e (and other transmitters on other wireless network interfaces, not shown, collectively termed transmitters 123, hereinafter) drive the electrical currents in the corresponding antennas 111a, 111b, 111c (and other antennas on other nodes, not shown, collectively termed antenna 111, hereinafter) based on the output from the encoders. These driven currents produce the modulated electromagnetic carrier waves that propagate through the atmosphere and space between nodes, represented in FIG. 1 by wireless links 140a, 140b (and other wireless links between other nodes, not shown, collectively termed wireless links 140, hereinafter).

The receivers 125a, 125b, 125c, 125d, 125e (and other receivers on other wireless network interfaces, not shown, collectively termed receivers 125, hereinafter) detect and amplify the electrical currents induced in the corresponding antennas 111 based on the modulated electromagnetic carrier waves that propagate through the atmosphere and space between nodes, represented in FIG. 1 by wireless links 140.

The decoders 124a, 124b, 124c, 124d, 124e (and other decoders on other wireless network interfaces, not shown, collectively termed decoders 124, hereinafter) convert modulated signals on electromagnetic carrier waves to digital data output in data packets and send those data packets to a routing processor 120. The decoding process performed by the decoder often includes using error correction bits to detect and sometimes correct transmission errors.

Although example network 100 depicts two subnetworks 102, one satellite 130, three intermediate network nodes 110, five wireless network interfaces and two implied wired network interfaces for purposes of illustration; in various other embodiments, a network includes more or fewer subnetworks, satellites, intermediate network nodes, wireless network interfaces and wired network interfaces.

Electromagnetic propagation of the carrier wave through the atmosphere and space between antennas of different nodes depends on environmental conditions and node geometries that both change over time. Furthermore, interference by natural and artificial electromagnetic energy sources at the carrier wave frequency, such as noise and scattering and multiply reflected signals, also change over time. Consequently the ratio of desired signal strength to interference at the carrier wave frequency varies with time. This ratio, sometimes called carrier to interference (C/I) ratio, and called signal to noise (S/N) ratio herein, affects bit errors detected by the error correction process at the decoder. Thus variations in S/N caused by changing environmental conditions and geometries lead to variations in bit error rates (BER) detected at a decoder.

Wireless link 140 performance is designed for very low bit error rates, e.g., rates less than about one error per million bits, $10^{-6}$. When error rates become too great, e.g., about one error per thousand bits, $10^{-3}$, then the link is dropped unless remedial action can recover a lower error rate. Remedial action includes increasing transmitter signal power. It is common practice in wireless network interfaces to increase the power of transmission, up to a maximum design power, when large bit error rates are detected by a decoder.

As described in the background section, increasing transmission power is not always sufficient. For example, interference by multi-path and scattering also increases with increases in transmission power. Furthermore, individual nodes have design power limits above which device failure ensues, so power can not be increased above the device limit. Furthermore, power budgets on satellites are extremely limited, making increased transmission power at a satellite node, like node 110c, impractical. Also differences in transmitter power and noise sources in the vicinity of a particular antenna mean that S/N ratio detected at a local receiver is not necessarily the same as S/N ratio at the remote antenna. Thus increasing transmitted power when receive S/N ratio is high is not always the correct response.

With satellite borne nodes especially, there is a range of geometries during which the satellite node is effective in a network, especially where the satellite is away from the horizon of a ground station node. For satellites with regular orbits, the window of effective operation is predictable, given favorable environmental conditions. There is benefit, however, to adapting to unfavorable environmental conditions, and extending the effective satellite geometries to those when the satellite is low on the horizon.

Another approach to improving the S/N ratio in the presence of unfavorable environmental or interference conditions is to change the clock rate of transmissions. Digital wireless transmissions modulate the characteristics of a carrier wave at a particular rate called a clock rate. In the presence of certain types of conditions that decrease S/N ratio, more data can be transmitted between bits that are lost due to environmental effects by increasing the clock rate.

Currently, satellite operators, such as operators for the National Aeronautics and Space Administration (NASA), wait until a wireless link quality deteriorates persistently, as evidenced by persistently high bit error rates. Then the operator manually regulates the signal characteristics to improve the S/N ratio. For example, the operator adjusts the power level or the carrier wave frequency or the clock rate until a low enough bit error rate is achieved to provide an effective wireless link. This manual process can take as long as 40 minutes, depending on the technician's expertise, in which case an intermittent problem might have come and gone.

Another approach to improving the S/N ratio in the presence of unfavorable environmental or interference conditions is to change the maximum data rate of transmissions. In the presence of certain types of conditions that decrease S/N ratio, data can be transmitted with increased signal to noise using more error correction bits. However, the more error correction bits added, the fewer bits are available for the original data. The original data bits that are transmitted on the carrier wave per unit time, excluding error correction bits, is called the data rate. The maximum data rate is decreased by the addition of further correction bits. The additional correction bits are supplied by changing the encoding scheme to one that uses more correction bits, or by repeating the transmission of some or all of the data bits over multiple clock pulses.

According to an illustrated embodiment of the invention, a bit error rate (BER) manager process (e.g., 150a) is added to the routing processor (e.g. routing processor 120a) to automatically adjust the clock rate or data rate or both of a remote transmitter (e.g., transmitter 123c on satellite node 110c) in response to detecting a high bit error rate at a local decoder (e.g., decoder 124a). FIG. 1 depicts BER managers 150a, 150b, 150c (and others, not shown, collectively termed BER managers 150, hereinafter) on routing processors 120a, 120b, 120c, respectively, that are connected to wireless network interfaces.

2.0 Link Conditioning Messages

In an illustrated embodiment, the BER manager processes 150 employ link conditioning messages in an IP payload to cause the remote transmitter to transmit signals that have an increased S/N ratio at the local receiver. FIG. 2A illustrates an example temporal sequence of messages to respond to reduced signal to noise on a wireless link 140a, according to an embodiment. In FIG. 2A, time increases downward. In this example, messages are exchanged between the routing process 120c on satellite node 110c and the routing process 120a on ground station intermediate node 110a. Messages sent from routing process 120c pass to encoder 122c and thence to transmitter (Tx) 123c. The message is carried over wireless link 140a to receiver (Rx) 125a, is decoded in decoder 124a and passed as digital data packets to routing process 120a.

Similarly, return messages from routing process 120a pass to encoder 122a and thence to transmitter (Tx) 123a. The message is carried over wireless link 140a to receiver 125c, is decoded in decoder 124c and passed as digital data packets to routing process 120c.

IP data plane messages 210 are sent from routing processor 120c over link 140a to routing process 120a. There routing process 120a distributes those messages into subnetwork 102a based on IP addresses in an IP header. The decoder 124a also sends to the routing processor 120a an IP control plane data packet that indicates the current bit error rate.

It is assumed for purposes of illustration that environmental conditions and geometries have combined to decrease the S/N ratio of signals received over link 140a from node 110c to levels that cause an increase in the bit error rate (BER) detected at decoder 124a to a rate near or above $10^{-3}$. The decoder 124a thus sends an IP control plane data packet that indicates the current bit error rate. The BER manager process 150a executing on routing processor 120a determines that the large error rate has persisted long enough (e.g., 3 seconds) to warrant first remedial action, as described in more detail in the next section. Consequently, the BER manager process 150a on routing processor 120a generates a link conditioning request (LCR) message 212 to notify the routing process 120c on the satellite node 110c that S/N ratio conditions have deteriorated to the point of needing first remedial action. As described in the next section, the LCR message is an IP control plane data packet that is not forwarded when received by routing processor 120c. In the illustrated embodiment, the LCR message includes in its IP payload data that indicates the current S/N ratio (SNR) and a first remedial action. Any data may be used to indicate the current SNR. In some embodiments, the current SNR is sent explicitly. In some embodiments, the current BER is included and the current SNR is deduced from the current BER by the routing processor 120c. Furthermore, any remedial action may be indicated. In the illustrated embodiment, the first remedial action is to increase the clock rate. In some embodiments, the remedial action is implicit and the LCR message 212 does not include data that indicates the first remedial action.

The LCR message 212 is short to enhance the chances that the message is properly received at the satellite node 110c in spite of possibly poor link conditions. It is here noted that in some circumstances, link condition in one direction is worse than in the opposite direction. For example, signal power transmitted by the ground station node (e.g., node 110a, 110b) is routinely greater than signal power transmitted by the satellite node 110c, and thus S/N received at the satellite node 110c may well be adequate to enjoy a low BER.

When the decoder 124c receives any message, such as the LCR message 212, the corresponding encoder 122c sends an acknowledgement (ACK) message 220. In some embodiments, ACK message 220 is omitted.

According to the illustrated embodiment, the routing process 120 also determines a new, higher clock rate based on the current SNR indicated in the LCR message 212. For example, each modulation type is associated with a different target SNR. A new clock rate is determined that is sufficient to increase the current SNR closer to the target SNR. A particular way to do this is described in the next section. The routing processor 120c then causes the encoder 122c to modulate the carrier wave at the new clock rate. In some embodiments, the encoder responds to the clock rate sent by the routing processor 120c, so that this step is accomplished simply by using the higher clock rate to send data from routing processor 120c to encoder 122c.

In the illustrated embodiment, the routing processor 120c sends a Link Conditioning Complete (LCC) message 222 at the new, higher clock rate. The LCC message is received at recover Rx 125a, decoded by decoder 124a, and used by routing processor 120a to determine that the first remedial action (e.g., clock rate increase) has been performed.

IP data plane messages (not shown) are sent from routing processor 120c over link 140a to routing processor 120a. There routing processor 120a distributes those messages into subnetwork 102a based on IP addresses in an IP header. The decoder 124a also sends an IP control plane data packet that indicates the current bit error rate.

It is further assumed for purposes of illustration that environmental conditions and geometries have combined to continue to depress the S/N ratio of signals received over link 140a from node 110c to levels that cause a high bit error rate (BER) detected at decoder 124a to a rate near or above $10^{-3}$. The decoder 124a thus sends an IP control plane data packet that indicates the current BER. The routing processor 120a determines that the large error rate has persisted long enough (e.g., 3 seconds) to warrant second remedial action, as described in more detail in the next section. Consequently, the routing processor 120a generates a second link conditioning request (LCR) message 230 to notify the routing process 120c on the satellite node 110c that poor S/N ratio conditions have continued to the point of needing second remedial action. In the illustrated embodiment, the second LCR message 230 includes in its IP payload data that indicates the new current SNR and a second remedial action. Any additional remedial action may be indicated. In the illustrated embodiment, the second remedial action is to decrease the data rate. In some embodiments, the second remedial action is implicit and the LCR message 230 does not include data that indicates the second remedial action.

When the decoder 124c receives any message, such as the second LCR message 230, the corresponding encoder 122c sends an ACK message, such as second ACK message 240. In some embodiments, second ACK message 240 is omitted.

According to the illustrated embodiment, the routing processor 120c also determines a new lower maximum data rate based on the current SNR indicated in the LCR message 230. For example, a new maximum data rate is determined that is sufficient to increase the current SNR closer to a target SNR. In some embodiments, the target SNR is different for the second remedial action than it is for the first remedial action. A particular way to do this is described in the next section. The routing processor 120c then sends data to the encoder 122c to enforce the new maximum data rate. In some embodiments, the encoder responds by changing the error correction code (ECC) used, or changing the modulation type, or sending each data bit over several clock pulses, or some combination.

In the illustrated embodiment, the routing processor 120c sends a Link Conditioning Complete (LCC) message 222 with data that indicates the new maximum data rate using the new maximum data rate. The LCC message is received at recover Rx 125a, decoded by decoder 124a, and used by routing processor 120a to determine that the second remedial action (e.g., decrease in maximum data rate) has been performed.

In the illustrated embodiment, the routing processor 120c sends further IP data packets using the new maximum data rate. If prudent or necessary, as described in more detail in the next subsection, the routing processor 120c also makes routing decisions based on priority of service, and drops data packets for the lowest priority or priorities of service to enforce the new maximum data rate.

In other embodiments, similar steps are added to apply further remedial actions to be taken by the transmitting remote node, such as to be taken by transmitting satellite node 110c.

According to the illustrated embodiment, remedial action is rescinded as the S/N rises. An example of the messages exchanged to revoke remedial action is described with reference to FIG. 2B. FIG. 2B illustrates an example temporal sequence of message to respond to restored S/N ratio on a wireless link, according to an embodiment.

IP data plane messages 260 are sent from routing processor 120c over link 140a to routing process 120a using one or both remedial actions to increase S/N ratio and reduce BER. Routing processor 120a distributes those messages into subnetwork 102a based on IP addresses in an IP header. The decoder 124a also sends to the routing processor 120a an IP control plane data packet that indicates the current bit error rate.

It is assumed for purposes of illustration that both remedial actions have been taken by the transmitting satellite node 110c and that environmental conditions and geometries have relented to increase the S/N ratio of signals received over link 140a from node 110c to levels that cause an decrease in the bit error rate (BER) detected at decoder 124a to a rate near or below a clearing threshed, such as $10^{-6}$. The decoder 124a thus sends to routing process 120a an IP control plane data packet that indicates the current bit error rate. The BER manager process 150a executing on routing processor 120a determines that the low error rate has persisted long enough (e.g., 5 minutes) to warrant removal of at least one remedial action, as described in more detail in the next section. Consequently, the routing processor 120a generates a link conditioning request (LCR) message 262 to notify the routing process 120c on the satellite node 110c that S/N ratio conditions have improved to the point of rescinding a remedial action. In the illustrated embodiment, the LCR message includes in its IP payload data that indicates the current SNR and a remedial action to rescind. Any remedial action may be indicated. In the illustrated embodiment, the remedial action to rescind is the decrease in data rate. In some embodiments, the remedial action is implicit and the LCR message 212 does not include data that indicates the remedial action to be rescinded.

When the decoder 124c receives any message, such as the LCR message 262, the corresponding encoder 122c sends an ACK message, such as ACK message 264. In some embodiments, ACK message 264 is omitted.

According to the illustrated embodiment, the routing process 120 also determines a new, higher maximum data rate based on the current SNR indicated in the LCR message 262. A new maximum data rate is determined that is sufficient to drop the current $SNR_C$ closer to the target SNR. A particular way to do this is described in the next subsection.

The routing processor 120c then sends data to the encoder 122c to enforce the new maximum data rate. In some embodiments, the encoder responds by changing the error correction code (ECC) used, or changing the modulation type, or sending each data bit over fewer clock pulses, or some combination.

In the illustrated embodiment, the routing processor 120c sends a Link Conditioning Complete (LCC) message 266 with data that indicates the new maximum data rate using the new maximum data rate. The LCC message 266 is received at recover Rx 125a, decoded by decoder 124a, and used by routing processor 120a to determine that the remedial action (e.g., decrease in maximum data rate) has been rescinded.

In the illustrated embodiment, the routing processor 120c sends further IP data packets (not shown) using the new maximum data rate. The routing processor 120c also begins to forward data packets for the lowest priority or priorities of service so such service benefits from the increased maximum data rate.

It is assumed for purposes of illustration that environmental conditions and geometries have combined to continue to increase the S/N ratio of signals received over link 140a from node 110c to levels that continue a low bit error rate (BER) detected at decoder 124a to a rate below about $10^{-6}$. The decoder 124a thus sends to routing processor 120a an IP control plane data packet that indicates the current bit error rate. The routing processor 120a determines that the low error rate has persisted long enough (e.g., 5 minutes) to warrant further rescission of remedial action, as described in more detail in the next section. Consequently, the routing processor 120a generates another link conditioning request (LCR) message 270 to notify the routing process 120c on the satellite node 110c that good S/N ratio conditions have continued to the point of rescinding remaining remedial action. In the illustrated embodiment, the latest LCR message 270 includes in its IP payload data that indicates the current SNR and a remedial action to rescind. Any remaining remedial action may be indicated. In the illustrated embodiment, the remaining remedial action is the increase in the data rate. In some embodiments, the second remedial action is implicit and the LCR message 270 does not include data that indicates the remaining remedial action.

When the decoder 124c receives any message, such as the latest LCR message 270, the corresponding encoder 122c sends an acknowledgement (ACK) message 272. In some embodiments, ACK message 272 is omitted.

According to the illustrated embodiment, the routing processor 120c determines a new lower clock rate based on the $SNR_C$ indicated in the LCR message 270. For example, a new clock rate is determined that is sufficient to decrease $SNR_C$ closer to $SNR_T$. A particular way to do this is described in the next subsection. The routing processor 120c then sends data to the encoder 122c to cause the new clock rate. In some embodiments, the encoder responds to a clock rate used by the routing processor 120c, and the clock rate used by the routing processor is increased to the new target clock rate.

In the illustrated embodiment, the routing processor 120c sends a Link Conditioning Complete (LCC) message 274 with data that indicates the new clock rate using the new decreased clock rate. The LCC message 272 is received at recover Rx 125a, decoded by decoder 124a, and used by routing processor 120a to determine that the second remedial action (e.g., clock rate increase) has been rescinded.

In the illustrated embodiment, the routing processor 120c sends further IP data packets 276 using the new increased data rate and decreased clock rate. Routing processor 120a distributes those messages into subnetwork 102a based on IP addresses in an IP header. The decoder 124a also sends an IP control plane data packet that indicates the current bit error rate.

In other embodiments, similar steps are added to rescind further remedial actions that have been taken by the transmitting remote node, such as taken by transmitting satellite node 110c.

3.0 Ber Manager Method

FIG. 3A, FIG. 3B, FIG. 3C and FIG. 3D illustrate a method 300 on a routing processor 120 to respond to changes in signal to noise ratio on a wireless link, according to an embodiment. Method 300 is a particular embodiment of BER manager process 150 executing on routing processor 120. Although steps are shown in FIG. 3A, FIG. 3B, FIG. 3C and FIG. 3D in a particular order for purposes of illustration, in other embodiments one or more steps are performed in a different order or overlapping in time by one or more processors acting in series or in parallel, or one or more steps are omitted or added or changed in some combination of ways.

In step 302, link conditioning configuration data is received. Any method may be used to receive the link conditioning configuration data. For example, in some embodiments the link conditioning configuration data is retrieved from files on the node (e.g., node 110a) where the BER manager process is executing, such as default values stored with the instructions used to implement the method 300. In various other embodiments, the link conditioning configuration data is retrieved from a database on the node or elsewhere on the network 100, in a message communicated through the network 100 from another process or server, either in response to a prompt from the BER manager process, or unsolicited. In some embodiments the link conditioning configuration data is input manually. In some embodiments, some combination of ways to receive the data is used.

The link conditioning configuration data includes data that indicates a threshold BER that will trigger the receiving node to start remedial action by notifying the transmitting node. In various embodiments, the link conditioning configuration data includes values for other parameters that are used in subsequent steps to determine when and how to remediate a high BER or restore default value for a low BER. In a first illustrated embodiment, the link conditioning configuration data includes parameters and values listed in Table 1.

TABLE 1

Example link conditioning configuration data.

| Parameter | Symbol | Value | Units |
|---|---|---|---|
| Modulation Type | MTYPE | DQPSK | (not applicable) |
| Target BER | BERT | $10^{-7}$ | error bits per bit |
| Set Threshold | SETBER | $10^{-3}$ | error bits per bit |
| Set Duration | SETDUR | 3 | seconds |
| Clear Threshold | CLRBER | $10^{-9}$ | error bits per bit |
| Clear Duration | CLRDUR | 120 | seconds |
| No Drop Priority | NODROP | 1 | QoS priority |
| Default clock rate | DCR | 2 | Mbps ($10^6$ bits per second) |
| Default maximum data rate | DMDR | 1.7 | Mbps |

The modulation type (MTYPE) indicates the modulation used by encoders 122 and decoders 124. In some embodiments, the initials are used; in some embodiments a code is used in which a different code value indicates a different modulation type. The relationship between BER and S/N ratio (SNR) depends on the modulation type. The target BER is used to determine a target SNR based on the modulation type.

The set threshold (SETBER) is a BER at or above which remedial action is to be taken, if available. The set duration (SETDUR) indicates a time for which the BER should be at or above the threshold to trigger remedial action. By requiring some duration, remedial action is not invoked for a quickly transient circumstance that corrects itself before the remedial action could take effect. Because most voice calls are set to hang up after about 5 to 8 seconds of silence, a value of 3 for SETDUR is selected in the illustrated embodiments so that remedial action has a chance to correct the BER before voice hang up occurs.

The clear threshold (CLRBER) is a BER at or below which remedial action already taken, if any, may be rescinded. The clear duration (CLRDUR) indicates a time for which the BER should be at or below the clear threshold to rescind remedial action. By requiring some duration, remedial action is not rescinded for a quickly transient circumstance that reverses itself before or shortly after the remedial action is rescinded. In an illustrated embodiment, the CLRBER and CLRDUR are only applied to remedial action that has reduced the data rate, because, in some embodiments, the reduced data rate drops low priority data packet types. It is desirable to restart forwarding the low priority data packets as soon as conditions allow.

In embodiments like the illustrated embodiment, in which the encoders 122 and decoders 124 are connected to routing processors that perform Layer 3 forwarding, such as IP forwarding, routing configuration data includes multiple quality of service (QoS) levels. Some QoS levels are given higher priority than others in this routing configuration data. For example, voice data and streaming video data packet types are given higher priority than file transfer, image or web page data packet types. In the illustrated embodiment, the lowest priority data packets are dropped first. In some embodiments, a QoS priority can be associated with a "no-drop" link condition parameter to prevent data packets types of that priority and higher priority from being dropped in any circumstances. A "no drop" priority is used to prevent dropping data rate to a point of squelching data packets of the "no-drop" priority or higher. Instead, the available data rate will be used in a "best effort" delivery scheme, well known in the art, to deliver all data packets of the "no drop" priority or higher. In these embodiments, another step (not shown) is included for receiving quality of service (QoS) priority configuration data. Current routers already perform such a step. Step 302 then includes data that indicates "no drop" condition for some QoS priority.

In other embodiments, other link conditioning configuration data is received, such as data that indicates a different set threshold and duration for a different remedial action and a different clear threshold and duration for the different remedial action and a different target S/N ratio for the different remedial action.

In the illustrated embodiments, default values for clock rate (DCR) and maximum data rate (DMDR) are also included in the link conditioning configuration data.

3.1 Receiving Node Steps

For purposes of illustration, it is assumed that method 300 is performed by BER manager 150a executing on ground station intermediate node 110a, and that the SNR for signals received from the remote transmitting satellite node 110c is deteriorating.

In step 304, it is determined whether a link conditioning request (LCR) message is received. An LCR request is a control plane message of type that indicates it is an LCR and payload that includes data that indicates a value of current SNR measured at a remote receiver, such as LCR 212, LCR 230, LCR 262, or LCR 270 received by satellite node 110c, described above. If so, then transmissions are to be modified and control passes to step 340, described below with reference to FIG. 3B. In the example, the satellite node 110c does not experience SNR problems on transmissions from node 110a; and therefore no LCR message is received at node 110a.

If a link conditioning request (LCR) message is not received, control passes to step 310. During step 310, data packet traffic is received and the local BER and duration is determined. For example, signals are received at decoder 125a and decoded to form data packets with a measured BER of $2 \times 10^{-3}$. The decoder 125a sends the data packets to BER manager process 150a executing on routing processor 120a.

The decoder 125a also sends an IP control packet with data indicating the current BER.

FIG. 4A is an example of an IP control packet 410 sent from a decoder 124 to routing processor 120, according to an embodiment. The IP control plane packet 410 includes an IP header 412 and an IP payload 420. The IP header 412 includes s type field 414 that indicates the IP packet is a control plane packet to be consumed by a router and not a packet to be forwarded to an end node. The IP payload 420 includes another type field 422 that indicates the type of control packet. The type field contains a value that indicates the IP control packet 410 is of a type that includes a local BER. The IP payload 420 also includes local BER field 424 which holds data that indicates a value of the local BER measured at the decoder, e.g., decoder 124a.

For example, during step 310, BER manager process 150a receives an IP control plane packet 410 from decoder 124a, which indicates a local BER of $2 \times 10^{-3}$.

During step 310 the current duration, if any, that the local BER has been above the set threshold (or thresholds) or below the clear threshold (or thresholds) is determined. Any method may be used to perform this step. For example, for each set threshold a counter is incremented if the local BER is at or above the threshold and cleared if the local BER is below it. Similarly, for each clear threshold a counter is incremented if the local BER is at or below the threshold and cleared if the local BER is above it. Control then passes to step 314. For purposes of illustration, it is assumed that, during step 310, a counter associated with SETBER is incremented to a value that corresponds to 3 seconds.

In step 314, it is determined whether the local BER exceeds the first threshold for the first duration. For example it is determined whether the counter associated with SETBER has a value that corresponds to 3 seconds or more. If not, control passes back to step 304 and 310 to continue to process data packets from the decoder. However, if it is determined in step 314 that the local BER exceeds the first threshold for the first duration, then control passes to step 320.

In step 320, the remote transmitting node is notified of the high local BER in a phase 1 link conditioning request (LCR) message. Phase 1 indicates a first remedial action is warranted. Control then passes to step 322.

FIG. 4B illustrates an example LCR message 430, according to an embodiment. The LCR message 430 is an IP packet that includes an IP header 412 and an IP payload 440. The IP header 412 includes s type field 414 that indicates the IP packet is a control plane packet. The IP payload 440 includes another type field 442 that indicates the type of packet. The type field 442 contains a value that indicates the IP packet 430 is of a type that corresponds to an LCR.

The IP payload 440 also includes phase field 443 that indicates whether a first or subsequent remedial action should be taken. In some embodiments a first remedial action is an increase in clock rate. In some embodiments, the first remedial action is a decrease in data rate. For purposes of illustration, it is assumed that the first remedial action is an increase in clock rate and a second remedial action is a decrease in data rate. An advantage of increasing clock rate before decreasing data rate is that an increase in clock rate does not involve a possible dropping of low priority data packet types.

Current BER field 444 contains data that indicates a value of the local BER measured at the decoder, e.g., decoder 124a. In some embodiments, the current BER is the latest local BER measured at the decoder. In some embodiments, the current BER is a maximum BER measured within the set duration. In some embodiments, the current BER is an average BER over the set duration. Using the value in the current BER field and the modulation type, a current SNR can be determined. In some embodiments other data that indicates the current XNR is included in addition t or instead of current BER field 444.

In some embodiments, the LCR includes a modulation type field (not shown) that holds data that indicates the modulation type. In the illustrated embodiment, the modulation type is included in the link conditioning configuration data and is not included in the LCR message 430. In some embodiments, the LCR includes a target BER field (not shown) that holds data that indicates the target BER for desired operations. In the illustrated embodiment, the target BER is included in the link conditioning configuration data and is not included in the LCR message 430.

Step 320 also includes clearing the counter associated with SETBER to reset that counter.

Step 320 also includes receiving an acknowledgment message from the remote transmitting node, that the LCR message 430 was received by the remote transmitting node, e.g., transmitting satellite node 110c. For example, ACK message 220, if any, and link conditioning completer (LCC) message 222 are received during step 320. The counter associated with SETBER for the second remedial action is cleared to reset it when the LCC is received.

FIG. 4C illustrates an example LCC message 450, according to an embodiment. The LCC message 450 is an IP control plane packet that includes an IP header 412 and an IP payload 460. The IP header 412 includes s type field 414 that indicates the IP packet is a control plane packet. The IP payload 460 includes another type field 462 that indicates the type of control packet. The type field 462 contains a value that indicates the IP control packet 450 is of a type that corresponds to an LCC.

The IP payload 460 also includes phase field 463 that indicates whether a first or subsequent remedial action has been taken.

New rate field 464 contains data that indicates a value of the new rate for the remedial action. For example, when the phase field 463 indicates a phase that involves a change in clock rate, then new rate field 464 holds data that indicates the new clock rate used by the remote transmitting node. When the phase field 463 indicates a phase that involves a change in maximum data rate, then new rate field 464 holds data that indicates the new maximum data rate used by the remote transmitting node. In some embodiments, the data in the new rate field 464 is used to synchronize the local decoder (e.g., decoder 124a) with the remote transmitting node encoder (e.g., 122c).

In some embodiments, an empirical relationship, described below, is used to determine a new clock rate or data rate based on a current SNR and target SNR, and both the local receiving node (e.g., ground station node 110a) and remote transmitting node (e.g., transmitting satellite node 110c) use the same data and same empirical relationship to determine the same new rate. In some of these embodiments, the new rate field 464 is omitted from LCC message 450.

In some embodiments, the LCC includes a modulation type field (not shown) that holds data that indicates the modulation type. In the illustrated embodiment, the modulation type is included in the link conditioning configuration data and is not included in the LCC message 430.

In step 322, data packet traffic is received and the local BER and duration is determined. For example, signals are received at decoder 125a and decoded to form data packets with a measured BER of $1 \times 10^{-3}$. The decoder 125a sends the data packets to BER manager process 150a executing on routing processor 120a. The decoder 125a also sends an IP control packet 410 with data indicating the current BER. For example, during step 322, BER manager process 150a receives an IP control plane packet 410 from decoder 124a, which indicates a local BER of $1\times10^{-3}$.

During step 322, the current duration, if any, that the local BER has been above the set threshold (or thresholds) or below the clear threshold (or thresholds) is determined. Control then passes to step 324. For purposes of illustration, it is assumed that, during step 322, a counter associated with SETBER for both remedial actions is incremented to a value that corresponds to 3 seconds.

In step 324, it is determined whether the local BER exceeds a second threshold for a second duration. In some embodiments a different threshold or duration or both is used for triggering the second remedial action; and the different threshold and duration is used in step 324. In the illustrated embodiment, the second threshold and duration are the same as the first, e.g., SETBER=$10^{-3}$ and SETDUR=3 seconds; and it is determined whether the counter associated with SETBER has a value that corresponds to 3 seconds or more.

Figure 3C:
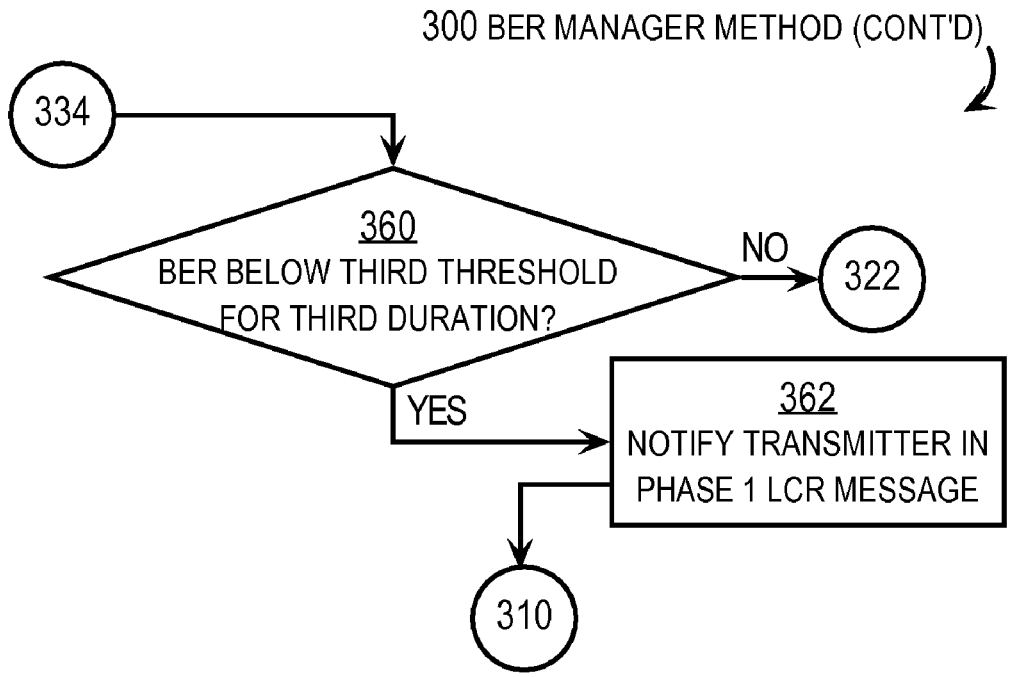

If not, control passes to step 360 depicted in FIG. 3C, to determine if BER has reduced sufficiently to rescind the first remedial action. In step 360, it is determined whether the local BER is below a third threshold for a third duration. In the illustrated embodiment, the third threshold is the clearing threshold CLRBER and the third duration is the clearing duration CLRDUR. If not, then conditions are not favorable to rescind the first remedial action, and control passes back to step 322 to process data packets and local BER values received from the local decoder, e.g., decoder 124a.

If it is determined that the local BER is below the third threshold for the third duration, e.g., below CLRBER=$10^{-9}$ for 120 seconds, then control passes to step 362. In step 362, the remote transmitting node is notified of the low local BER in a phase 1 LCR message 430. The phase field 443 indicates Phase 1, i.e., the first remedial action. The current BER field 444 holds data that indicates the current BER. Because the current BER is well below target, the remote transmitting node will recognize that phase 1 remedial action is being rescinded. In some embodiments, the phase field 443 holds data that indicate phase 1 remedial action is to be rescinded; for example a value of 3 in phase field 443 indicates to the remote transmitting node to rescind the first remedial action. Control then passes to step 310, described above, to continue to receive data packets and monitor local BER.

In the example, the local BER is only $1\times10^{-5}$ and not below the clear threshold CLRBER=$10^{-9}$. Therefore a counter associated with the CLRBER is cleared and does not indicate a duration that equals or exceed 120 seconds. Control passes back to step 322.

If it is determined in step 324 that the local BER exceeds the second threshold for the second duration, then control passes to step 330. In step 330, the remote transmitting node is notified of the high local BER in a phase 2 link conditioning request (LCR) message. Phase 2 indicates a second remedial action is warranted. Control then passes to step 332.

In step 332, data packet traffic is received and the local BER and duration is determined. For example, signals are received at decoder 125a and decoded to form data packets with a measured BER of $1\times10^{-5}$. The decoder 125a sends the data packets to BER manager process 150a executing on routing processor 120a. The decoder 125a also sends an IP control packet 410 with data indicating the current BER. For example, during step 332, BER manager process 150a receives an IP control plane packet 410 from decoder 124a, which indicates a local BER of $1\times10^{-5}$.

During step 332, the current duration, if any, that the local BER has been above the set threshold (or thresholds) or below the clear threshold (or thresholds) is determined. Control then passes to step 370, described below, to determine if BER has reduced sufficiently to rescind the second remedial action. For purposes of illustration, it is assumed that a counter associated with SETBER is not incremented during step 332.

Figure 3D:
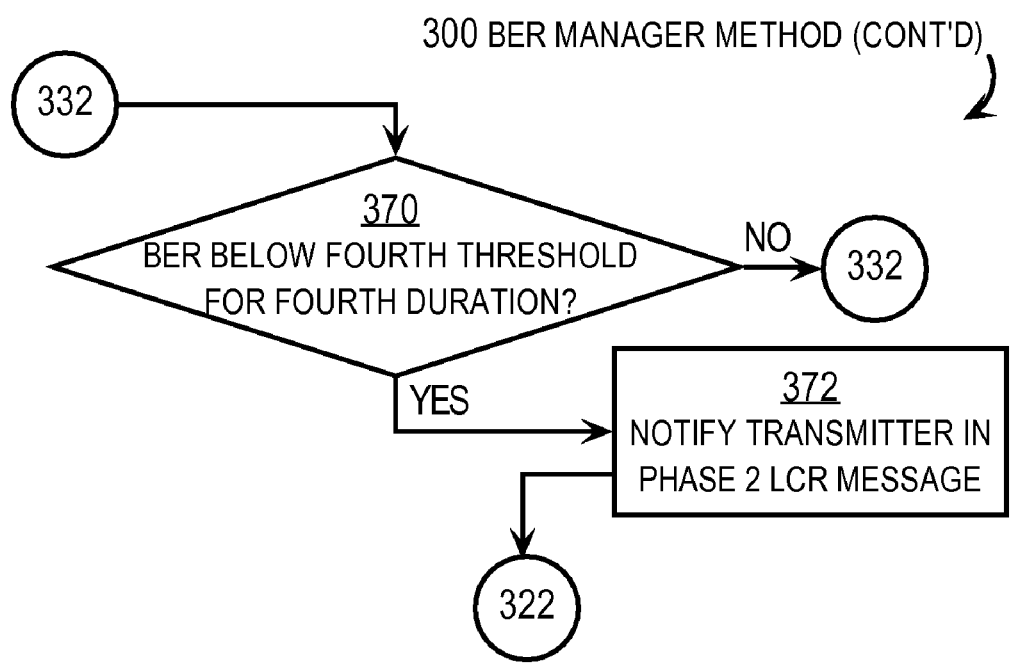

In step 370 depicted in FIG. 3D, it is determined whether the local BER has reduced sufficiently to rescind the second remedial action. In step 370, it is determined whether the local BER is below a fourth threshold for a fourth duration. In the illustrated embodiment, the fourth threshold is the same as the third clearing threshold CLRBER and the fourth duration is the same as the clearing duration CLRDUR. If not, then conditions are not favorable to rescind the second remedial action, and control passes back to step 332 to process data packets and local BER values received from the local decoder, e.g., decoder 124a.

If it is determined that the local BER is below the fourth threshold for the fourth duration, e.g., below CLRBER=$10^{-9}$ for 120 seconds or more, then control passes to step 372. In step 372, the remote transmitting node is notified of the low local BER in a phase 2 LCR message 430. The phase field 443 indicates Phase 2, i.e., the second remedial action. The current BER field 444 holds data that indicates the current BER. Because the current BER is well below target, the remote transmitting node will recognize that phase 2 remedial action is being rescinded. In some embodiments, the phase field 443 holds data that indicates phase 2 remedial action is to be rescinded; for example a value of 4 in phase field 443 indicates to the remote transmitting node to rescind the second remedial action. Control then passes to step 322, described above, to continue to receive data packets and monitor local BER.

In the example, the local BER is only $1\times10^{-5}$ and not below the clear threshold CLRBER=$10^{-9}$. Therefore a counter associated with the CLRBER is cleared to reset it and does not indicate a duration that equals or exceed 120 seconds. Control passes back to step 322.

In some embodiments that use only one phase of remedial action, steps 324, 330 332, and 370 are omitted, and control passes directly from step 322 to step 360.

3.2 Transmitting Node Steps

For purposes of illustration, it is assumed that method 300 is performed by BER manager 150c executing on transmitting satellite node 110c, and that the SNR is deteriorating for signals received at ground station intermediate node 120a from transmitting satellite node 110c. As described above, the ground station node 120a sends one or more LCR messages 430 to the transmitting satellite node 110c. It is further assumed that there is a different target BER for phase 2 than for phase 1, and for simplicity, that the phase 1 target BER=set threshed=clear threshold=$10^{-6}$, as given in Table 2.

TABLE 2

Second example link conditioning configuration data.

| Parameter | Symbol | Value | Units |
|---|---|---|---|
| Modulation Type | MTYPE | DQPSK | (not applicable) |
| Phase 1 Target BER | BERT1 | $10^{-6}$ | error bits per bit |
| Phase 2 Target BER | BERT2 | $10^{-7}$ | error bits per bit |
| Set Threshold | SETBER | $10^{-6}$ | error bits per bit |
| Set Duration | SETDUR | 3 | seconds |
| Clear Threshold | CLRBER | $10^{-6}$ | error bits per bit |
| Clear Duration | CLRDUR | 300 | seconds |
| No Drop Priority | NODROP | 1 | QoS priority |
| Default clock rate | DCR | 2 | Mbps |
| Default maximum data rate | DMDR | 1.7 | Mbps |

In step 304, it is determined whether a link conditioning request (LCR) message is received. If so, then transmissions are to be modified and control passes to step 340, with reference to FIG. 3B. In the example, the receiving ground station node 110a experiences SNR problems on transmissions from transmitting satellite node 110c; an, therefore, a phase LCR message 212 of form LCR message 430 is received at satellite node 110c. Control passes to step 340 in FIG. 3B.

In step 340, it is determined whether the LCR message 212 is a phase 1 message based on the contents of the phase field 443 of a general LCR message 430. If not, control passes to step 352, described below. If the LCR message 212 is a phase 1 message, control passes to step 342.

In step 342, the current S/N ratio (SNR) is determined based on the LCR message. In the illustrated embodiment, the current BER ($BER_C$) is determined from the data in the current BER field 444. A well known table relates BER to SNR for each modulation type. Using the table for the modulation type used by encoders 122a, 122x and decoders 124a, 124c, $SNR_C$ is determined from $BER_C$. It is assumed for purposes of illustration that the current BER field holds data that indicates $BER_C=10^{-3}$. It is further assumed that the table for modulation type DQPSK is used to determine that $SNR_C=7.9$ deciBels (dB) for $BER_C=10^{-3}$. It is further assumed that the table for DQPSK is used to determine the target S/N ratio, $SNR_T=11.1$ dB, for the target BER, $BERT=10^{-6}$. The current state of the link condition is given in Table 3. The current clock rate (CR) and maximum data rate (MDR) are the default values.

TABLE 3

First State of Link Conditions.

| parameter | value | units |
|---|---|---|
| $SNR_T$ | 11.1 | dB |
| $SNR_C$ | 7.9 | dB |
| CR | 2 | Mbps |
| MDR | 1.7 | Mbps |

In step 344 an ACK message 220 is sent to the ground station node 110a, to acknowledge receipt of the LCR message 212. In some embodiments, step 344 is omitted.

In step 346 the first remedial action is determined. In the illustrated embodiment, the first remedial action is to increase the clock rate. To determine the new clock rate an empirical relationship is used that relates SNR changes to the ratio of clock rate (CR) to maximum data rate (MDR). The relationship is given by Equation 1.

$$newSNR = SNR_C + 10 \log(newCR/newMDR) \quad (1)$$

In step 346, the new rate for the first remedial action is determined based on Equation 1. The value of $SNR_C$ is measured based on the type of transmission and BER currently experienced. Each transmission type has a well defined curve of BER versus SNR. The measured $SNR_C$ is used with the target new SNR to determine the relative changes in CR and MDR. In the illustrated embodiment, the first remedial action is to change the clock rate and leave the data rate constant. Thus Equation 1 is solved for a new clock rate, designated newCR, that gives the target SNR when using the current MDR, as given by Equation 2

$$SNR_T = SNR_C + 10 \log(newCR/MDR) \quad (2)$$

Plugging in values for $SNR_C$, $SNR_T$, and MDR from Table 3 gives $$11.1 = 7.9 + 10 \log(newCR/1.7) \quad (3a)$$

which gives $$0.32 = \log(newCR/1.7) \quad (3b)$$

$$10^{0.32} = newCR/1.7 \quad (3c)$$

$$1.7 * 10^{0.32} = newCR \quad (3d)$$

$$newCR = 3.55 \text{ Mbps} \quad (3e)$$

Thus the revised state of the link condition is expected to be given by Table 4.

TABLE 4

Second State of Link Conditions.

| parameter | value | units |
|---|---|---|
| $SNR_T$ | 11.1 | dB |
| $SNR_C$ | ~11.1? | dB |
| CR | 3.55 | Mbps |
| MDR | 1.7 | Mbps |

It is noted that, if $SNR_C$ from an LCR is greater than the $SNR_T$, then the LCR is a request to rescind the first remedial action. In this case, the clock rate is returned to its default value. For example, the clock rate is returned from 3.55 Mbps to 2 Mbps.

In step 348, a first LCC message 222 is sent at the new clock rate. For example, the routing process 120c sends an LCC packet 430 at the new clock rate to the encoder 122c, which propagates the new clock rate to the transmitter 123c. The receiver 125a responds automatically at the new clock rate and is decoded by decoder 124a automatically at the new clock rate. In some embodiments the computations of Equation 3 are replicated on the receiving ground station node 110a and used to change the clock rate of decoder 124a.

In step 349, all the QoS priority traffic is sent at the new clock rate. In other embodiments, in which the first remedial action is a decrease in the maximum data rate, some QoS priority data packet types are dropped to enforce the new maximum data rate.

If it is determined, in step 340, that the LCR message (e.g., LCR message 230) is not a phase 1 message, then control passes to step 352. In step 352, the current S/N ratio ($SNR_C$) is determined based on the phase 2 LCR message. In the illustrated embodiment, the current BER ($BER_C$) is determined from the data in the current BER field 444. A well known table relates BER to SNR for each modulation type. Using the table, $SNR_C$ is determined from $BER_C$. It is assumed for purposes of illustration that the current BER field 444 holds data that indicates $BER_C=10^{-3}$. It is further assumed that the table for modulation type DQPSK is used to determine that $SNR_C=7.9$ dB for $BER_C=10^{-3}$. It is further assumed that the table for DQPSK is used to determine that the phase 2 $SNR_T=12.0$ dB for the target BER, $BERT=10^{-7}$. The current state of the link condition is given in Table 5. The current clock rate (CR) is the increased clock rate determined during phase 1 and the maximum data rate (MDR) is the default value.

TABLE 5

Third State of Link Conditions.

| parameter | value | units |
|---|---|---|
| $SNR_T$ | 12.0 | dB |
| $SNR_C$ | 7.9 | dB |
| CR | 3.55 | Mbps |
| MDR | 1.7 | Mbps |

In step 354 an ACK message 240 is sent to the ground station node 110a, to acknowledge receipt of the LCR message 230. In some embodiments, step 354 is omitted.

In step 356 the second remedial action is determined. In the illustrated embodiment, the second remedial action is to decrease the maximum data rate. To determine the new data rate the empirical relationship given by Equation 1 is used. In the illustrated embodiment, the second remedial action is to change the maximum data rate and leave the clock rate constant. Thus Equation 1 is solved for a new maximum data rate, designated newMDR, that gives $SNR_T$ when using the current CR, as given by Equation 4

$$SNR_T = SNR_C + 10 \log(CR/newMDR) \qquad (4)$$

Plugging in values for $SNR_C$, $SNR_T$, and CR from Table 5 gives $$12.0 = 7.9 + 10 \log(3.55/newMDR) \qquad (5a)$$

which gives $$0.41 = \log(3.55/newMDR) \qquad (5b)$$

$$10^{0.41} = 3.55/newMDR \qquad (5c)$$

$$newMDR = 3.55 \ast 10^{-0.41} \qquad (5d)$$

$$newMDR = 1.4 \text{ Mbps} \qquad (5e)$$

Thus the revised state of the link condition is expected to be given by Table 6.

TABLE 6

Fourth State of Link Conditions.

| parameter | value | units |
|---|---|---|
| $SNR_T$ | 12.0 | dB |
| $SNR_C$ | ~12.0? | dB |
| CR | 3.55 | Mbps |
| MDR | 1.4 | Mbps |

It is noted that, if $SNR_C$ from an LCR is greater than the $SNR_T$, then the LCR is a request to rescind the second remedial action. In this case, the data rate is returned to its default value. For example, the data rate is increased from 1.4 Mbps to 1.7 Mbps.

In step 358, a second LCC message 242 is sent at the new data rate. For example, the routing process 120c sends an LCC packet 430 at the new data rate to the encoder 122c, which propagates the new data rate to the transmitter 123c. The receiver 125a responds automatically at the new data rate and is decoded by decoder 124a automatically at the new data rate. In some embodiments the computations of Equation 5 are replicated on the receiving ground station node 110a and used to change the data rate of decoder 124a.

In step 359, the QoS priority traffic is sent at the new data rate. In some embodiments, the new data rate is implemented by using a different error correction code in encoder 122c and decoder 124a. In some embodiments, the new data rate is implemented by sending the same data over multiple clock cycles. In some embodiments, the new data rate is implemented by dropping the lowest QoS priority data packet types. In some embodiments, a combination of these implementations is used.

For example, it is assumed that the QoS configuration data includes the priorities given in Table 7.

TABLE 7

Example QoS configuration data.

| data packet type | QoS priority |
|---|---|
| voice: Real-time Transport Protocol (RTP) data on port 16001 | 1 |
| video: RTP data on port 16002 | 2 |
| data/telemetry: Transmission Control Protocol (TCP) data | 3 |
| Imagery: Hypertext Transfer Protocol (HTTP) traffic, port 80 | 4 |

Voice involves 800 kbps ($10^3$ bits per second) to support 10 voice conversations. Video involves 600 bps for 2 high quality video streams. Data telemetry involves 100 kbps in bursts. Imagery involves 200 kbps. To reduce current MDR of 1.7 Mbps to the new 1.4 Mbps, the QoS priority 3 and 4 data packets are dropped. This saves 100 kbps and 200 kbps=300 kbps=0.3 Mbps. Thus the maximum data rate is reduced to 1.4 Mbps just by dropping QoS priorities 3 and 4. The extra clock cycles can be used for repeat transmission or for extra error correction bits.

Method 300 creates a feedback mechanism at the IP layer which allows an intermediate network node to make real-time decisions on how to increase the Carrier/Interference ratio, while the carrier is suffering interference, by leveraging the clock rate or the data rate, or both, of the problematic transmitter. A system based on this method can detect and recover from a temporary or sustained error condition by varying the link's clock rate locally at the router with the problematic transmitter. The clocking change then propagates to the encoder/decoder and the system sees a reduction in BER. If the desired C/I ratio is not achieved using the clock rate, then this method resorts to varying the data rate at the router with the problematic transmitter.

4.0 Implementation Mechanisms—Hardware Overview

FIG. 5 illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitutes computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 510 for use by the processor from an external terminal 512, such as a terminal with a keyboard containing alphanumeric keys operated by a human user, or a sensor. A sensor detects conditions in its vicinity and transforms those detections into signals compatible with the signals used to represent information in computer system 500. Other external components of terminal 512 coupled to bus 510, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 512. In some embodiments, terminal 512 is omitted.

Computer system 500 also includes one or more instances of a communications interface 570 coupled to bus 510. Communication interface 570 provides a two-way communication coupling to a variety of external devices that operate with their own processors, such as printers, scanners, external disks, and terminal 512. Firmware or software running in the computer system 500 provides a terminal interface or character-based command interface so that external commands can be given to the computer system. For example, communication interface 570 may be a parallel port or a serial port such as an RS-232 or RS-422 interface, or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware. Logic encoded in one or more tangible media includes one or both of computer instructions and special purpose hardware.

In the illustrated computer used as a router, the computer system 500 includes switching system 530 as special purpose hardware for switching information for flow over a network. Switching system 530 typically includes multiple communications interfaces, such as communications interface 570, for coupling to multiple other devices. In general, each coupling is with a network link 532 that is connected to another device in or attached to a network, such as local network 580 in the illustrated embodiment, to which a variety of external devices with their own processors are connected. In some embodiments an input interface or an output interface or both are linked to each of one or more external network elements. Although three network links 532a, 532b, 532c are included in network links 532 in the illustrated embodiment, in other embodiments, more or fewer links are connected to switching system 530. Network links 532 typically provides information communication through one or more networks to other devices that use or process the information. For example, network link 532b may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides routing information for use with switching system 530.

The switching system 530 includes logic and circuitry configured to perform switching functions associated with passing information among elements of network 580, including passing information received along one network link, e.g. 532a, as output on the same or different network link, e.g., 532c. The switching system 530 switches information traffic arriving on an input interface to an output interface according to pre-determined protocols and conventions that are well known. In some embodiments, switching system 530 includes its own processor and memory to perform some of the switching functions in software. In some embodiments, switching system 530 relies on processor 502, memory 504, ROM 506, storage 508, or some combination, to perform one or more switching functions in software. For example, switching system 530, in cooperation with processor 504 implementing a particular protocol, can determine a destination of a packet of data arriving on input interface on link 532a and send it to the correct destination using output interface on link 532c. The destinations may include host 582, server 592, other terminal devices connected to local network 580 or Internet 590, or other routing and switching devices in local network 580 or Internet 590.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520 and circuits in switching system 530, may be used in place of or in combination with software to implement the invention. Thus, embodiments of the invention are not limited to any specific combination of hardware and software.

The signals transmitted over network link 532 and other networks through communications interfaces such as interface 570, which carry information to and from computer system 500, are example forms of carrier waves. Computer system 500 can send and receive information, including program code, through the networks 580, 590 among others, through network links 532 and communications interfaces such as interface 570. In an example using the Internet 590, a server 592 transmits program code for a particular application, requested by a message sent from computer 500, through Internet 590, ISP equipment 584, local network 580 and network link 532b through communications interface in switching system 530. The received code may be executed by processor 502 or switching system 530 as it is received, or may be stored in storage device 508 or other non-volatile storage for later execution, or both. In this manner, computer system 500 may obtain application program code in the form of a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to an infra-red signal, a carrier wave serving as the network link 532b. An infrared detector serving as communications interface in switching system 530 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502 or switching system 530.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus comprising:
a network interface that includes a decoder connected to a wireless receiver and an encoder connected to a wireless transmitter, the network interface configured for wireless communication with a remote apparatus, the network interface further including logic encoded in one or more tangible media for execution and, when executed, performs the steps of:
receiving, from the decoder, first error data that indicates a current error rate that corresponds to a first inbound data packet received from the remote apparatus;
determining, based at least in part on the first error data, whether the remote apparatus should increase a current signal to noise ratio of transmissions from the remote apparatus;
in response to a determination that the remote apparatus should increase the current signal to noise ratio of transmissions from the remote apparatus, sending through the network interface a first outbound data packet that includes first link conditioning request data that indicates the current signal to noise ratio for one or more data packets received from the remote apparatus based at least in part on the first error data, wherein the remote apparatus is configured for increasing the signal to noise ratio of transmissions from the remote apparatus in response to receiving the outbound data packet;
the first link conditioning request data further indicating a first mode of increasing signal to noise ratio of transmissions, wherein the remote apparatus is configured for applying the first mode of increasing signal to noise ratio of transmissions in response to receiving the first outbound data packet;
receiving, from the decoder, second error data that indicates a second error rate that corresponds to a second inbound data packet received after the first inbound data packet from the remote apparatus;
determining, based on the second error data, whether the remote apparatus should further increase the current signal to noise ratio of transmissions from the remote apparatus; and
in response to a determination that the remote apparatus should further increase the current signal to noise ratio of transmissions from the remote apparatus, sending through the network interface a second outbound data packet that includes second link conditioning request data that indicates a second mode of increasing signal to noise ratio and the current signal to noise ratio for one or more data packets received from the remote apparatus based at least in part on the second error data, wherein the remote apparatus is configured for applying the second mode of increasing signal to noise ratio in response receiving the second outbound data packet.

2. An apparatus as recited in claim 1, wherein the first mode of increasing signal to noise ratio is an increase in a number of pulses per second transmitted from the remote apparatus.

3. An apparatus as recited in claim 1, wherein the first mode of increasing signal to noise ratio is a decrease in a maximum fraction of pulses that may be used to transmit a data packet from the remote apparatus.

4. An apparatus as recited in claim 1, wherein:
the first mode of increasing signal to noise ratio is an increase in a number of pulses per second transmitted from the remote apparatus; and
the second mode of increasing signal to noise ratio is a decrease in a maximum fraction of pulses that may be used to transmit a data packet from the remote apparatus.

5. An apparatus as recited in claim 1, wherein:
the second mode of increasing signal to noise ratio is an increase in a number of pulses per second transmitted from the remote apparatus; and
the first mode of increasing signal to noise ratio is a decrease in a maximum fraction of pulses that may be used to transmit a data packet from the remote apparatus.

6. An apparatus as recited in claim 1, wherein the logic, when executed, performs the steps of:
determining whether the second inbound data packet includes third link conditioning request data that indicates a transmitted signal to noise ratio for one or more data packets transmitted from the apparatus; and
in response to a determination that the second inbound data packet includes the third link conditioning request data, then changing data sent to the encoder in order to effect an increase in the transmitted signal to noise ratio to a target signal to noise ratio.

7. An apparatus comprising:
a network interface that includes a decoder connected to a wireless receiver and an encoder connected to a wireless transmitter, the network interface configured for wireless communication with a remote apparatus; and
logic encoded in one or more tangible media for execution and, when executed, performs the steps of:
receiving, from the remote apparatus through the network interface, a first inbound data packet;
determining whether the first inbound data packet includes a first link conditioning request data that indicates a first signal to noise ratio for one or more first data packets received at the remote apparatus from the apparatus;
in response to a determination that the first inbound data packet includes the first link conditioning request data, changing data sent to the encoder in order to effect an increase in the first signal to noise ratio to a target signal to noise ratio in accordance with a first mode of increasing signal to noise ratio indicated in the first link conditioning request data;
receiving, from the remote apparatus through the network interface, a second inbound data packet;
determining whether the second inbound data packet includes second link conditioning request data that indicates a second signal to noise ratio for one or more second data packets received at the remote apparatus from the apparatus after the one or more first data packets; and
in response to a determination that the second inbound data packet includes the second link conditioning request data, changing data sent to the encoder in order to effect an increase in the second signal to noise ratio to the target signal to noise ratio in accordance with a second mode of increasing signal to noise ratio indicated in the second link conditioning request data.

8. An apparatus as recited in claim 7, said changing data sent to the encoder comprising increasing a number of pulses per second of data sent to the encoder for transmissions from the apparatus.

9. An apparatus as recited in claim 7, said changing data sent to the encoder comprising decreasing a maximum fraction of pulses that may be used to send a data packet through the network interface.

10. An apparatus as recited in claim 9, said changing data sent to the encoder comprising not sending to the encoder a data packet having a type of data packet associated with a lowest priority of a plurality of priorities.

11. A method of managing error rates comprising the steps of:
receiving, from a decoder connected to a wireless receiver for wireless communication with a remote apparatus, first error data that indicates a current error rate corresponding to a first inbound data packet received from the remote apparatus;
determining, based at least in part on the first error data, whether the remote apparatus should increase a current signal to noise ratio of transmissions from the remote apparatus;
in response to a determination that the remote apparatus should increase the current signal to noise ratio of transmissions from the remote apparatus, sending, to an encoder connected to a wireless transmitter in wireless communication with the remote apparatus, a first outbound data packet that includes first link conditioning request data that indicates a current signal to noise ratio for one or more data packets received from the remote apparatus based at least in part on the first error data, wherein the remote apparatus is configured for increasing signal to noise ratio of transmissions from the remote apparatus in response to receiving the first outbound data packet;
transmitting one or more data packets through the encoder to the remote apparatus;
receiving, from the remote apparatus through the decoder, a second inbound data packet;
determining whether the second inbound data packet includes second link conditioning request data that indicates a transmitted signal to noise ratio for one or more data packets transmitted to the remote apparatus; and
in response to a determination that the second inbound data packet includes the second link conditioning request data, changing data sent to the encoder in order to effect an increase in the transmitted signal to noise ratio to a target signal to noise ratio.

12. A method as recited in claim 11, wherein:
the first link conditioning request data further indicates a first mode of increasing signal to noise ratio of transmissions; and
the remote apparatus is configured for applying the first mode of increasing signal to noise ratio of transmissions in response to receiving the first outbound data packet.

13. A method as recited in claim 12, wherein the first mode of increasing signal to noise ratio is an increase in a number of pulses per second transmitted from the remote apparatus.

14. A method as recited in claim 12, wherein the first mode of increasing signal to noise ratio is a decrease in a maximum fraction of pulses that may be used to transmit a data packet from the remote apparatus.

15. A method as recited in claim 12, wherein,
the method further comprising the steps of:
receiving, from the decoder, second error data that indicates a second error rate that corresponds to a second inbound data packet received after the first inbound data packet from the remote apparatus;
determining, based on the second error data, whether the remote apparatus should further increase the current signal to noise ratio of transmissions from the remote apparatus; and
in response to a determination that the remote apparatus should further increase the current signal to noise ratio of transmissions from the remote apparatus, then sending through the network interface a second outbound data packet that includes second link conditioning request data that indicates a second mode of increasing signal to noise ratio and the current signal to noise ratio for one or more data packets received from the remote apparatus based at least in part on the second error data, and
the remote apparatus is configured for applying the second mode of increasing signal to noise, in response to receiving the second outbound data packet.

16. A method as recited in claim 15, wherein:
the first mode of increasing signal to noise ratio is an increase in a number of pulses per second transmitted from the remote apparatus; and
the second mode of increasing signal to noise ratio is a decrease in a maximum fraction of pulses that may be used to transmit a data packet from the remote apparatus.

17. A method as recited in claim 15, wherein:
the second mode of increasing signal to noise ratio is an increase in a number of pulses per second transmitted from the remote apparatus; and
the first mode of increasing signal to noise ratio is a decrease in a maximum fraction of pulses that may be used to transmit a data packet from the remote apparatus.

18. A method as recited in claim 11, wherein:
the method further comprising receiving wireless link configuration data that indicates a threshold high error rate and high error rate duration; and
said step of determining whether the remote apparatus should increase the current signal to noise ratio of transmissions from the remote apparatus further comprises determining, based at least in part on the wireless link configuration data, whether the remote apparatus should increase the current signal to noise ratio.

19. A method as recited in claim 18, said step of receiving wireless link configuration data further comprising receiving wireless link configuration data that indicates a threshold low error rate and low error rate duration.

20. A method as recited in claim 18, said step of receiving wireless link configuration data further comprising receiving wireless link configuration data that indicates an electromagnetic signal modulation type used by the encoder and decoder.

21. A method as recited in claim 18, said step of receiving wireless link configuration data further comprising receiving wireless link configuration data that indicates a target bit error rate.

22. A method as recited in claim 18, said step of receiving wireless link configuration data further comprising receiving wireless link configuration data that indicates an error correction code used by the encoder and decoder.

23. A method as recited in claim 11, wherein:
the method further comprises the step of receiving quality of service configuration data that indicates a plurality of priorities for a corresponding plurality of types of data packets; and
said step of changing data sent to the encoder in order to effect an increase in the transmitted signal to noise ratio further comprises not sending to the encoder a data packet having a type of data packet associated with a lowest priority of the plurality of priorities.

24. A method comprising the steps of:
transmitting one or more first data packets through an encoder connected to a wireless transmitter configured for wireless communication with a remote apparatus;
receiving, from a decoder connected to a wireless receiver in wireless communication with the remote apparatus, a first inbound data packet;
determining whether the first inbound data packet includes first link conditioning request data that indicates a first signal to noise ratio for the one or more first data packets transmitted to the remote apparatus, and the first link conditioning request data further indicates a first mode of increasing signal to noise ratio of transmissions;
in response to a determination that the first inbound data packet includes the first link conditioning request data, changing first data sent to the encoder in order to effect an increase in the first signal to noise ratio to a target signal to noise ratio, said step of changing the first data sent to the encoder comprising applying the first mode of increasing signal to noise ratio of transmissions;
receiving, from the decoder, a second inbound data packet;
determining whether the second inbound data packet includes second link conditioning request data that indicates a second signal to noise ratio for one or more second data packets transmitted to the remote apparatus from the wireless transmitter after the one or more first data packets, and the second link conditioning request data further indicates a second mode of increasing signal to noise ratio of transmissions;
in response to a determination that the second inbound data packet includes the second link conditioning request data, changing the second data sent to the encoder in order to effect an increase in the second signal to noise ratio to the target signal to noise ratio, said step of changing the second data comprising applying the first mode of increasing signal to noise ratio of transmissions.

25. A method as recited in claim 24, said step of changing the first data sent to the encoder comprising increasing a number of pulses per second of data sent to the encoder for transmission to the remote apparatus.

26. A method as recited in claim 24, said step of changing the second data sent to the encoder comprising decreasing a maximum fraction of pulses that may be used to send a data packet through the encoder.

27. A method as recited in claim 24, wherein:
the method further comprises the step of receiving quality of service configuration data that indicates a plurality of priorities for a corresponding plurality of types of data packets; and
said step of changing the first data sent to the encoder in order to effect an increase in the first signal to noise ratio further comprises not sending to the encoder a data packet having a type of data packet associated with a lowest priority of the plurality of priorities.

28. A method as recited in claim 24, wherein:

the method further comprising receiving wireless link configuration data that indicates an electromagnetic signal modulation type used by the encoder and decoder; and said step of changing the first data sent to the encoder in order to effect an increase in the first signal to noise ratio to the target signal to noise ratio is based at least in part on the wireless link configuration data.

29. A method as recited in claim 24, wherein:

the method further comprising receiving wireless link configuration data that indicates an error correction code used by the encoder and decoder; and said step of changing data sent to the encoder in order to effect an increase in the current signal to noise ratio to a target signal to noise ratio is based at least in part on the wireless link configuration.

30. An apparatus comprising:

a processor; and a memory comprising instructions executable with the processor to:

receive, from a decoder connected to a wireless receiver configured for wireless communication with a remote apparatus, first error data that indicates a first error rate corresponding to a first inbound data packet received from the remote apparatus;

determine, based at least in part on the first error data, whether the remote apparatus should increase a current signal to noise ratio of transmissions from the remote apparatus; and send, to an encoder connected to a wireless transmitter in wireless communication with the remote apparatus, a first outbound data packet that includes first link conditioning request data that indicates the current signal to noise ratio for one or more data packets received from the remote apparatus based at least in part on the first error data in response to a determination that the remote apparatus should increase the current signal to noise ratio of transmissions from the remote apparatus, wherein the remote apparatus is configured to increase signal to noise ratio of transmissions in response to receipt of the first outbound data packet;

wherein the first link conditioning request data further indicates a first mode of increasing signal to noise ratio of transmissions, and the remote apparatus is configured to apply the first mode of increasing signal to noise ratio of transmissions in response to receipt the first outbound data packet;

receive, from the decoder, second error data that indicates a second error rate corresponding to a second inbound data packet received after the first inbound data packet from the remote apparatus;

determine, based on the second error data, whether the remote apparatus should further increase the current signal to noise ratio of transmissions from the remote apparatus; and send through the network interface a second outbound data packet that includes second link conditioning request data indicating a second mode of increasing signal to noise ratio based at least in part on the second error data in response to a determination that the remote apparatus should further increase the current signal to noise ratio of transmissions from the remote apparatus, wherein the remote apparatus is configured to apply the second mode of increasing signal to noise ratio of transmissions in response to receipt the second outbound data packet.

31. An apparatus comprising:

a processor; and a memory comprising instructions executable with the processor to:

transmit one or more first data packets through an encoder connected to a wireless transmitter configured for wireless communication with a remote apparatus;

receive, from a decoder connected to a wireless receiver in wireless communication with the remote apparatus, a first inbound data packet;

determine whether the first inbound data packet includes first link conditioning request data that indicates a first signal to noise ratio for the one or more first data packets transmitted to the remote apparatus; and change data sent to the encoder in order to effect an increase in the first signal to noise ratio to a target signal to noise ratio, in response to a determination that the first inbound data packet includes the first link conditioning request data, the first signal to noise ratio changed in accordance with a first mode of increasing signal to noise ratio indicated in the first link conditioning request data;

receive a second inbound data packet from the remote apparatus through the decoder;

determine whether the second inbound data packet includes a second link conditioning request data that indicates a second signal to noise ratio for one or more second data packets received from the apparatus at the remote apparatus after the one or more first data packets; and change data sent to the encoder in order to effect an increase in the second signal to noise ratio to the target signal to noise ratio in accordance with a second mode of increasing signal to noise ratio indicated in the second link conditioning request data.

\* \* \* \* \*